United States Patent
Yonetake et al.

(10) Patent No.: US 7,942,222 B2
(45) Date of Patent: May 17, 2011

(54) SWING-TYPE OPERATION MACHINE

(75) Inventors: Nobukata Yonetake, Tokyo (JP);
Hirotaka Iida, Tokyo (JP); Akitoshi Nishikawa, Tokyo (JP); Mitsunobu Ohsuda, Tokyo (JP); Shigeru Obinata, Chikuma (JP); Kousuke Hosoda, Kobe (JP); Ryo Moriya, Kobe (JP)

(73) Assignee: Caterpillars S.A.R.L., Geneva (CH)

( * ) Notice: Subject to any disclaimer, the term of this patent is extended or adjusted under 35 U.S.C. 154(b) by 322 days.

(21) Appl. No.: 11/887,763

(22) PCT Filed: Mar. 23, 2006

(86) PCT No.: PCT/JP2006/306602
§ 371 (c)(1),
(2), (4) Date: Oct. 3, 2007

(87) PCT Pub. No.: WO2006/120812
PCT Pub. Date: Nov. 16, 2006

(65) Prior Publication Data
US 2008/0257623 A1     Oct. 23, 2008

(30) Foreign Application Priority Data
May 13, 2005   (JP) .............................. 2005-140526

(51) Int. Cl.
*B60K 11/04*   (2006.01)
(52) U.S. Cl. ..................................... 180/68.4; 180/68.1
(58) Field of Classification Search ................. 180/68.1, 180/68.4
See application file for complete search history.

(56) References Cited

U.S. PATENT DOCUMENTS

| 6,922,925 | B2 * | 8/2005 | Watanabe et al. | 37/466 |
| 7,188,865 | B2 | 3/2007 | Sugiyama et al. | |
| 7,287,810 | B2 * | 10/2007 | Ishii et al. | 296/190.05 |
| 7,481,289 | B2 * | 1/2009 | Ueda et al. | 180/89.16 |
| 7,513,326 | B2 * | 4/2009 | Miyachi | 180/68.4 |

FOREIGN PATENT DOCUMENTS

| JP | 1-148671 | 6/1989 |
| JP | 10-331657 | 12/1998 |

(Continued)

OTHER PUBLICATIONS

Japanese Office Action dated Feb. 1, 2011.

*Primary Examiner* — J. Allen Shriver, II
*Assistant Examiner* — Erez Gurari
(74) *Attorney, Agent, or Firm* — McGinn IP Law Group, PLLC

(57) ABSTRACT

To realize a mounting structure on the rear side of the seat of the operator station on which the seat and equipment for operation are installed in the swing table of a swing-type operation machine, the mounting structure being simple in construction yet imparted with a sufficiently large strength without increasing the size of the swing table or without utilizing the counter weight. The swing-type operation machine comprises an under carriage, a swing table mounted on the under carriage so as to freely swing thereon, an operator station mounted on the swing table and on which a seat and equipment for operation are installed, and a heat exchanger-mounting body supporting a heat exchanger for cooling the engine that is positioned at the back of the seat of the operator station and supporting the rear part of the seat of the operator station.

2 Claims, 3 Drawing Sheets

FOREIGN PATENT DOCUMENTS

| | | |
|---|---|---|
| JP | 2002-61222 | 2/2002 |
| JP | 2004-58796 | 2/2004 |
| JP | 2004-143672 | 5/2004 |
| JP | 2004-285699 | 10/2004 |
| JP | 2004-300675 A | 10/2004 |
| JP | 2005-14642 | 1/2005 |
| JP | 2005-119545 A | 5/2005 |

* cited by examiner

SWING-TYPE OPERATION MACHINE

TECHNICAL FIELD

The present invention relates to a swing-type operation machine. More specifically, the invention relates to a structure for mounting an operator station on a swing table of a swing-type operation machine.

BACKGROUND ART

The swing-type operation machine such as a hydraulic excavator includes an under carriage and a swing table mounted on the under carriage so as to swing thereon. On the swing table is mounted an operator station on which are installed a seat and equipment for operation. An engine is installed on the lower side of the operator station at the back of the seat (see, for example, patent documents 1 and 2).

The outer circumferential edge of the swing table of the swing-type operation machine is formed in a size as small as possible to decrease the probability of interference with the surrounding obstacles when undergoing the swinging operation as well as to maintain good circumferential view from the operator's seat. Therefore, the operator station, engine and the like are installed in a limited space together with other equipment and devices.

When the operator station is mounted on the swing table, a pair of right and left legs is provided on the rear part of the seat to avoid the engine (see, for example, patent document 1), or a counter weight installed on the outer side of the engine in parallel therewith is provided with a pair of right and left support poles (see, for example, patent document 2).

Patent document 1: JP-A-2004-143672
Patent document 2: JP-A-2004-285699

DISCLOSURE OF THE INVENTION

In the conventional swing-type operation machines of the types described above, however, it has been desired to improve the mounting structure on the rear part of the seat of the operator station in a manner as described below.
(1) When a pair of right and left legs is to be provided, it is difficult to provide large legs having rigidity due to limited space in the swing table. An increase in the legs requires an increased installation space resulting in an increase in the outer circumferential edge of the swing table.
(2) The counter weight may be provided with the pair of right and left support poles. However, the swing-type operation machines are not necessarily all provided with the counter weight which is the balancing weight. Or, the counter weight is not necessarily installed at a position adapted to supporting the operator station if it is provided.

The present invention was accomplished in view of the above-mentioned facts, and its technical problem is to realize a mounting structure on the rear side of the seat of the operator station on which the seat and equipment for operation are installed on the swing table of a swing-type operation machine, the mounting structure being simple in construction yet imparted with a sufficiently large strength without increasing the size of the swing table or without utilizing the counter weight.

In order to solve the above technical problem, the present invention provides a swing-type operation machine comprising an under carriage, a swing table mounted on the under carriage so as to freely swing thereon, an operator station mounted on the swing table and on which a seat and equipment for operation are installed, and a heat exchanger-mounting body supporting a heat exchanger for cooling the engine that is positioned at the back of the seat of the operator station and supporting the rear part of the seat of the operator station.

Preferably, the heat exchanger-mounting body is formed in a double housing type surrounding the heat exchanger, and the operator station is supported on an upper part of the double housing.

Further, provision is made of a support body mounted on the swing table to support the rear part of the seat of the operator station, the support body is provided with a coupling plate that extends toward the heat exchanger-mounting body and is coupled to the heat exchanger-mounting body, and a back-of-the-seat portion of the operator station is mounted on the coupling plate.

Further, the operator station includes a seat-mounting portion supporting the seat, a floor portion positioned on the front lower side of the seat-mounting portion, and a back-of-the-seat portion positioned on the rear upper side thereof, all of which extending like flat plates, the floor portion being mounted on a swing flame of the swing table via an elastic mount and the back-of-the-seat portion being mounted on the coupling plate via an elastic mount.

The swing-type operation machine constituted according to the present invention comprises an operator station on the swing table mounted on an under carriage and on which a seat and equipment for operation are installed, and a heat exchanger-mounting body supporting a heat exchanger into which the cooling air flows from the engine positioned on the rear lower side of the seat of the operator station and supporting the rear part of the seat of the operator station. Upon mounting the operator station on the heat exchanger-mounting body, therefore, there is neither the need of newly providing the support legs in this portion nor the need of utilizing the counter weight. Namely, the operator station can be mounted relying upon a simple structure while imparting a sufficiently large strength thereto.

BRIEF DESCRIPTION OF THE DRAWINGS

FIG. 1 is viewed from the direction of arrows A-A;

FIG. 2 is viewed from the direction of arrows B-B;

FIG. 2 is viewed from the direction of arrows C-C.

BEST MODE FOR CARRYING OUT THE INVENTION

The swing-type operation machine constituted according to the present invention will now be described in further detail with reference to the accompanying drawings illustrating a preferred embodiment of a hydraulic excavator which is one of the representative examples.

Figure 5:
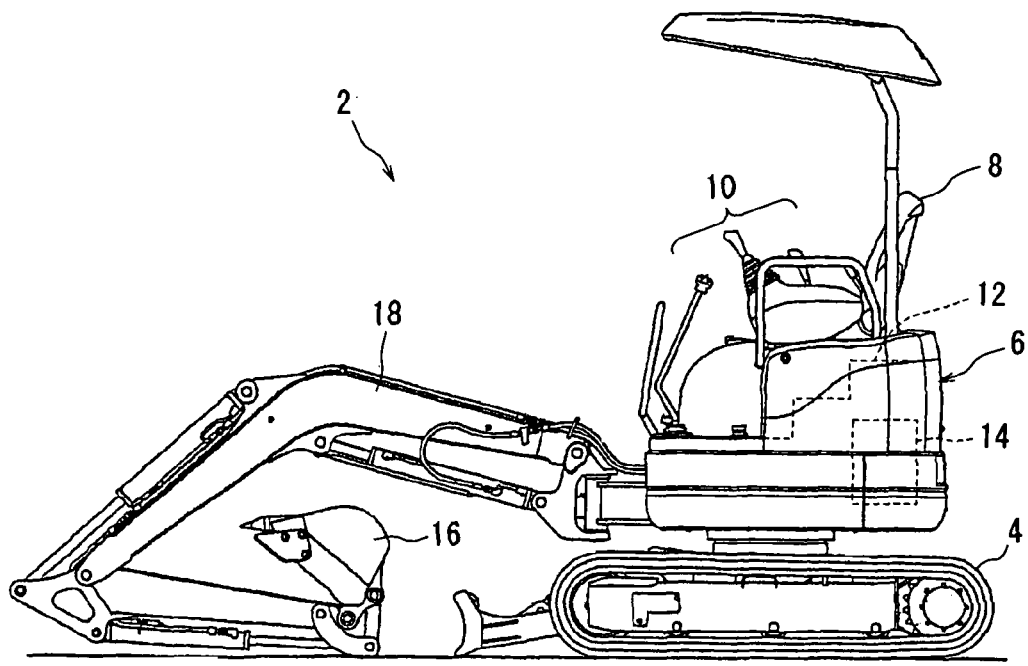
FIG. 5 is a side view of a hydraulic excavator which is a representative example of the swing-type operation machine.

Referring to FIG. 5, the hydraulic excavator which is generally designated at 2 includes an under carriage 4, a swing table 6 mounted on the under carriage 4 so as to freely swing thereon, an operator station 12 mounted on the swing table 6 and on which a seat and equipment 10 for operation are installed, and an engine 14 positioned under the rear part of the seat 8 of the operator station 12 (right side in FIG. 5). A multi-articulated operation device 18 having a bucket 16 is attached to the swing table 6 in front of the operator's seat 8 (left side in FIG. 5).

Figure 1:
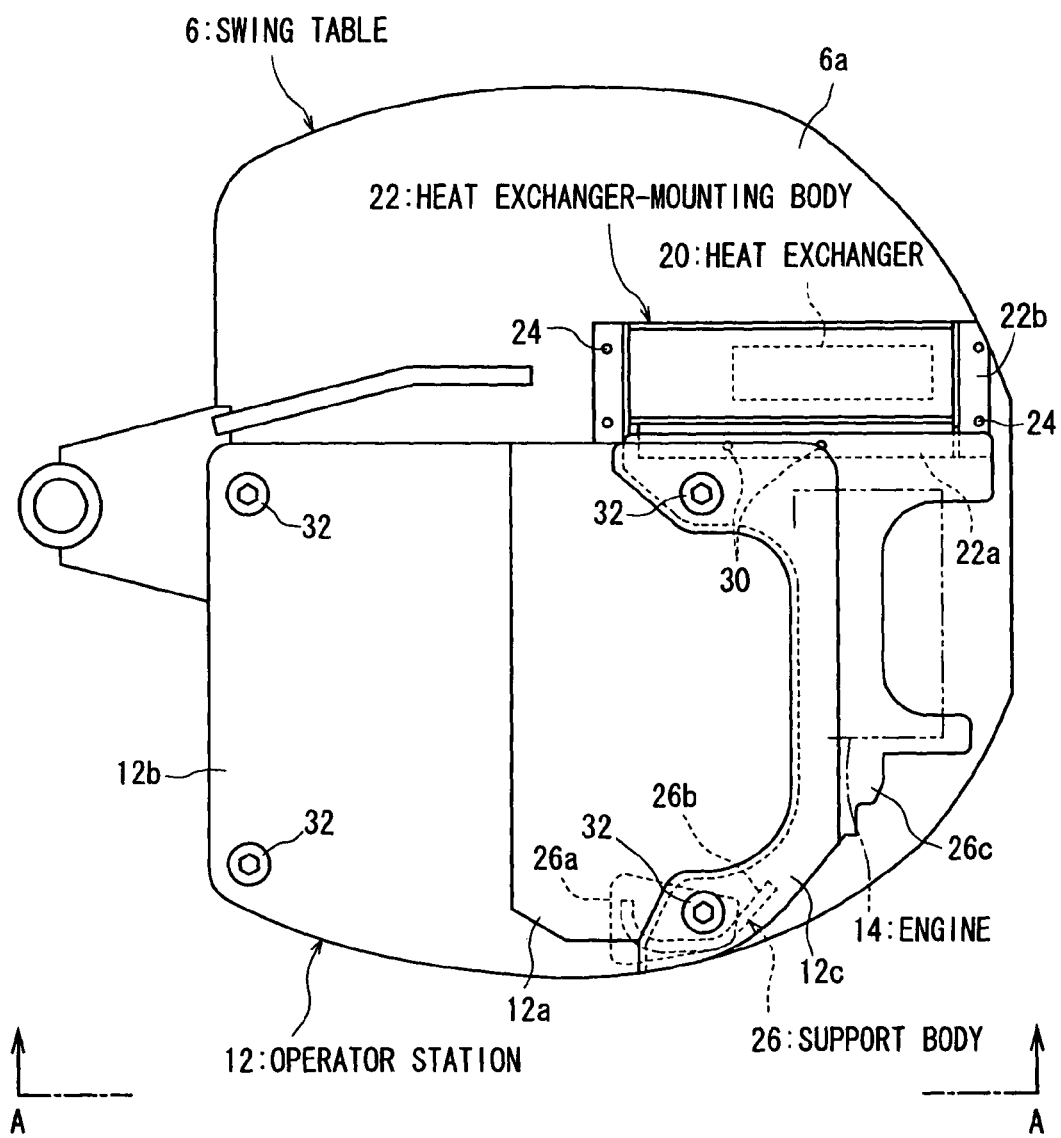
FIG. 1 is a plan view of a major constitution of the invention chiefly illustrating an operator station of a swing table in the swing-type operation machine constituted according to the present invention.
Figure 2:
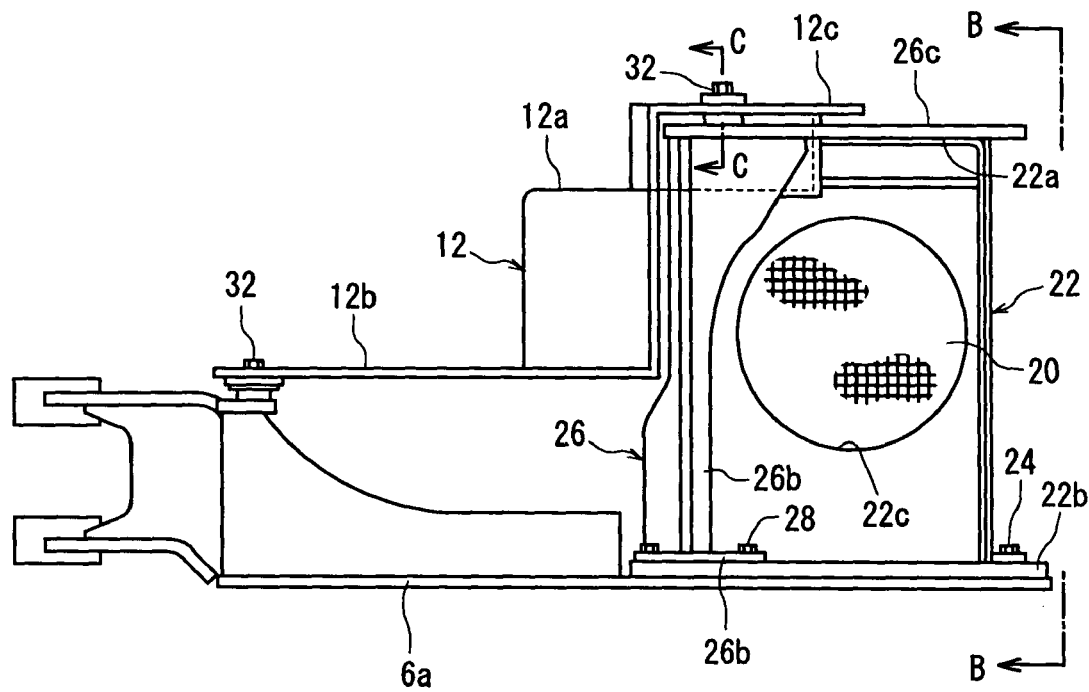
FIG. 2 is a side view of when
Figure 3:
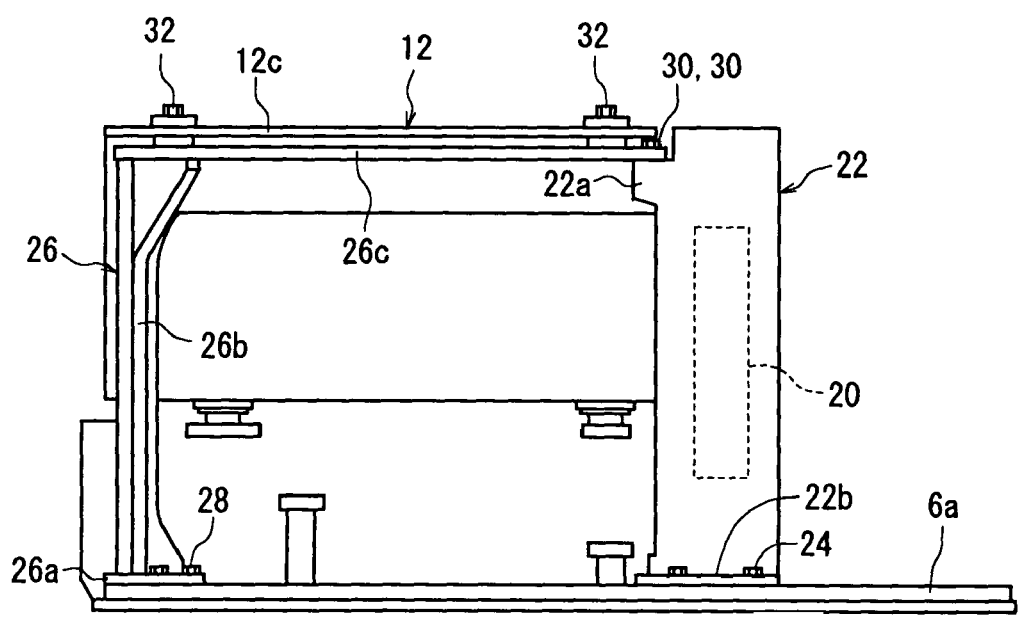
FIG. 3 is a rear view of when

It will be described in further detail with reference to FIG. 1 which is a plan view illustrating a major constitution of the invention in the swing table 6 focusing on the operator station 12, FIG. 2 which is a side view thereof and FIG. 3 which is a rear view thereof. The operator station 12 includes a seat-mounting portion 12a supporting the seat 8 (FIG. 5), a floor portion 12b positioned on the front lower side of the seat-mounting portion 12a, and a back-of-the-seat portion 12c positioned on the rear upper side thereof, all of which extending like flat plates.

The swing table 6 supports a heat exchanger 20 such as a radiator or an oil cooler into which will flow the cooling air from the engine 14 positioned on the rear lower side of the operator station 12, and further includes a heat exchanger-mounting body 22 for supporting one side or the right side of the rear part of the seat 8 of the operator station 12.

The heat exchanger-mounting body 22 is formed rigid in a double housing rectangular parallelepiped shape surrounding the heat exchanger 20, and a rack portion 22a is provided on the double housing to support the operator station 12. The heat exchanger-mounting body 22 has its base portion 22b mounted on a swing frame 6a of the swing table 6 by using a plurality of bolts 24. The heat exchanger-mounting body 22 has a circular opening 22c formed in the surface thereof facing the engine 14 permitting the cooling air flow created by an engine fan (not shown) to pass through.

On the other side or the left side of the rear part of the seat on the operator station 12, a support body 26 is erected on the swing frame 6a of the swing table 6 to support the above portion. The support body 26 includes a base plate 26a mounted on the swing frame 6a by using a plurality of bolts 28, a support pole 26b of the shape of a channel in cross section erected integrally with the base plate 26a, and a coupling plate 26c attached to an upper end of a support pole 26b, extends toward the rack portion 22a of the heat exchanger-mounting body 22, and is attached to the rack portion 22a by using two bolts 30.

Due to the coupling plate 26c, the right and left sides of the back-of-the-seat portion 12c of the operator station 12 are mounted via elastic mounts 32. Therefore, one side or the right side of the rear part of the seat on the operator station 12 is mounted on the heat exchanger-mounting body 22 via the coupling plate 26c.

The operator station 12 is mounted at its right and left two places of the floor portion 12b on the swing frame 6a through similar elastic mounts 32 together with the right and left sides of the back-of-the-seat portion 12c.

Figure 4:
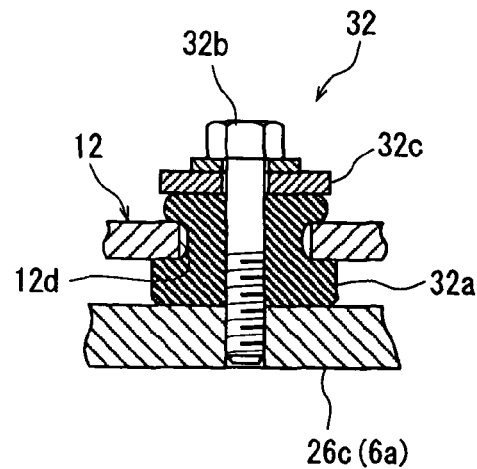
FIG. 4 is a sectional view illustrating, on an enlarged scale, an elastic mount of when

The elastic mount 32 may be the known one. If described with reference to FIG. 4, a cylindrical mount rubber 32a with flange made of a synthetic rubber is inserted in a through hole 12d of the operator station 12 from the side of the coupling plate 26c (swing frame 6a), a bolt 32b is passed through the mount rubber 32a via a washer 32c and is screwed into a threaded hole in the coupling plate 26c (swing frame 6a) to compress the mounting rubber 32a via the washer 32c to thereby elastically hold the operator station 12 by the mount rubber 32a.

Described below is the mode operation of the above-mentioned swing-type operation machine.

The swing-type operation machine 2 comprises the operator station 12 on the swing table 6 mounted on the under carriage 4 and on which the seat 8 and equipment 10 for operation are installed, and the heat exchanger-mounting body 22 supporting the heat exchanger 20 for cooling the engine 14 which is positioned at the rear lower side of the seat of the operation station 12 and supporting either the right side or the left side of the rear part of the seat of the operator station 12. Upon mounting a portion of the operator station 12 on the heat exchanger-mounting body 22, therefore, there is neither the need of newly providing the support legs in this portion nor the need of utilizing the counter weight. Namely, the operator station 12 can be mounted relying upon a simple structure while imparting a sufficiently large strength thereto.

Further, the heat exchanger-mounting body 22 is formed in the double housing type surrounding the heat exchanger 20, and the operator station 12 is supported on the double housing. Accordingly, the operator station 12 is firmly supported relying on a simple structure.

Further, the support body 26 is provided on the swing table 6 to support the other side of the rear part of the seat of the operator station 12, and the back-of-the-seat portion 12c of the operator station 12 is mounted on the coupling plate 26c that extends toward the heat exchanger-mounting body 22 of the support body 26 and is coupled to the heat exchanger-mounting body 22. Therefore, the heat exchanger-mounting body 22 and the support body 26 are coupled together through the coupling plate 26c, and the operator station 12 is more firmly supported.

Further, the operator station 12 includes, integrally together, the seat-mounting portion 12a supporting the seat 8, the floor portion 12b positioned on the front lower side of the seat-mounting portion 12a, and the back-of-the-seat portion 12c positioned on the rear upper side thereof, all of which extending like flat plates, the floor portion 12b being mounted on the swing flame 6a of the swing table 6 via the elastic mount 32 and the rear part 12b of the seat being mounted on the coupling plate 26c via the elastic mount 32. Therefore, the seat 8 and equipment 10 for operation are shielded by the partitioning wall from the engine 14 and are, further, elastically supported, offering a comfortable seat for the operator.

The invention claimed is:

1. A swing-type operation machine, comprising:
an under carriage;
a swing table mounted on the under carriage so as to freely swing thereon;
an operator station mounted on the swing table and on which a seat and an equipment for operation are installed;
a heat exchanger-mounting body supporting a heat exchanger for cooling the engine that is positioned at a back of the seat of the operator station and supporting a rear part of the seat of the operator station; and
a support body mounted on the swing table to support the rear part of the seat of the operator station,
wherein the heat exchanger-mounting body is formed to surround the heat exchanger,
wherein the operator station is supported on an upper part of the gate-shaped heat exchanger-mounting body,
wherein the support body further comprises a coupling plate, and
wherein the heat exchanger-mounting body further comprises a rack portion that supports the coupling plate,
wherein the rack portion is located on the upper part of the heat exchanger-mounting body to support the operator station.
wherein the support body further comprises:
a base plate mounted on the swing table; and
a support pole connected to the base plate at a first end, and
wherein the coupling plate is connected to a second end of the support pole opposite the first end.

2. A swing-type operation machine, comprising:
an under carriage;
a swing table mounted on the under carriage;
an operator station mounted on the swing table;
a heat exchanger-mounting body supporting a heat exchanger that is located at a back of the operator station, the heat exchanger-mounting body supporting a first end of the operator station; and
a support body mounted on the swing table to support a second end of the operator station,
   wherein the heat exchanger-mounting body is formed to surround the heat exchanger,
   wherein the operator station is supported on an upper part of the gate-shaped heat exchanger-mounting body,
   wherein the support body further comprises a coupling plate,
   wherein the heat exchanger-mounting body further comprises a rack portion that supports the coupling plate,
   wherein the rack portion is located on the upper part of the heat exchanger-mounting body to support the operator station,
   wherein the support body further comprises:
     a base plate mounted on the swing table; and
     a support pole connected to the base plate at a first end, and
   wherein the coupling plate is connected to a second end of the support pole opposite the first end.

\* \* \* \* \*